US011677235B2

(12) United States Patent
Clauberg

(10) Patent No.: US 11,677,235 B2
(45) Date of Patent: Jun. 13, 2023

(54) AVALANCHE TRIGGERED OVERVOLTAGE PROTECTION

(71) Applicant: SIGNIFY HOLDING B.V., Eindhoven (NL)

(72) Inventor: Bernd Clauberg, Schaumburg, IL (US)

(73) Assignee: SIGNIFY HOLDING B.V., Eindhoven (NL)

( * ) Notice: Subject to any disclaimer, the term of this patent is extended or adjusted under 35 U.S.C. 154(b) by 77 days.

(21) Appl. No.: 17/598,262

(22) PCT Filed: Mar. 24, 2020

(86) PCT No.: PCT/EP2020/058072
§ 371 (c)(1),
(2) Date: Sep. 25, 2021

(87) PCT Pub. No.: WO2020/193504
PCT Pub. Date: Oct. 1, 2020

(65) Prior Publication Data
US 2022/0190595 A1 Jun. 16, 2022

Related U.S. Application Data

(60) Provisional application No. 62/825,062, filed on Mar. 28, 2019.

(30) Foreign Application Priority Data

Apr. 9, 2019 (EP) ..................................... 19168024

(51) Int. Cl.
*H02H 9/04* (2006.01)
*H02M 1/32* (2007.01)

(52) U.S. Cl.
CPC ................ *H02H 9/04* (2013.01); *H02M 1/32* (2013.01)

(58) Field of Classification Search
CPC ............ H02H 9/04; H02H 9/041; H02M 1/32
USPC .......................................................... 361/91.1
See application file for complete search history.

(56) References Cited

U.S. PATENT DOCUMENTS

| 3,943,427 | A | | 3/1976 | Tolstov et al. | |
|---|---|---|---|---|---|
| 4,093,977 | A | * | 6/1978 | Wilson | H01H 83/02 361/44 |
| 5,436,786 | A | * | 7/1995 | Pelly | H02H 9/041 361/91.8 |
| 6,657,841 | B1 | | 12/2003 | Melchert et al. | |
| 2002/0159212 | A1 | * | 10/2002 | Oughton, Jr. | H02H 9/041 361/111 |

(Continued)

FOREIGN PATENT DOCUMENTS

CN 205902169 U 1/2017
FR 2733648 A1 10/1996

*Primary Examiner* — Dharti H Patel

(57) ABSTRACT

A device, system and method protects from overvoltages. A power control device includes a component (310) configured to be powered according to a duty cycle. The power control device includes a controller (330) configured to determine the duty cycle that places the component on or off. The power control device includes a comparator (335) configured to determine when the duty cycle is off and an overvoltage is being experienced by the component. When the duty cycle is off and the overvoltage is being experienced by the component, the comparator selects a circuit pathway (345, 350) including a clamping device (350).

10 Claims, 4 Drawing Sheets

(56) References Cited

U.S. PATENT DOCUMENTS

2004/0264088 A1* 12/2004 Hooper .................... H02H 3/24
                                                              361/92
2020/0106267 A1*  4/2020 Pichon ................... H02H 9/005
2020/0351999 A1* 11/2020 Chen .................... H05B 45/325

* cited by examiner

AVALANCHE TRIGGERED OVERVOLTAGE PROTECTION

CROSS-REFERENCE TO PRIOR APPLICATIONS

This application is the U.S. National Phase application under 35 U.S.C. § 371 of International Application No. PCT/EP2020/058072, filed on Mar. 24, 2020, which claims the benefit of U.S. Provisional Application No. 62/825,062, filed on Mar. 28, 2019, and European Patent Application No. 19168024.8, filed on Apr. 9, 2019. These applications are hereby incorporated by reference herein.

BACKGROUND OF THE INVENTION

A power source may supply energy to various components of an electronic device. The electronic device may include various pathways leading from a power converter that receives the power from the power source to the various components. The electronic device may incorporate safeguards to ensure that the power flowing through the pathways does not result in damage to or improper operation of the electronic device. For example, when the electronic device is used in an outdoor environment or other environment with poor power quality or is prone to power surges, the electronic device may include a metal oxide varistor (MOV) or other transient suppression device to protect the internal electronics or components. However, a simple MOV arrangement may not prevent or reduce a "let through" voltage to a level that a downstream component (e.g., a semiconductor) is capable of tolerating.

To support the MOV, the electronic device may include a second MOV. The second MOV may be a stage clamping MOV with a silicon diode alternating current (SIDAC) switch or similarly triggered component arranged in series. For example, the electronic device may have a light emitting diode (LED) load and a LED driver may include the second MOV. The second MOV may have a lower clamping voltage (e.g., a maximum amount of voltage allowed to pass before further voltage is restricted from passing) and therefore a lower let-through voltage. The intent of the second MOV with the SIDAC in series is to set the combined trigger voltage of the second MOV and SIDAC such that these components always trigger below the breakdown voltage rating of downstream components such as a field effect transistor (FET) to guarantee that these downstream components do not fail. This type of protection circuit through the second MOV and SIDAC is configured to clamp transients (e.g., momentary variation in current, voltage, frequency, etc.) from lightning surges or similar short duration overvoltage transients (e.g., a transient lasting less than a few milliseconds).

FIG. 1 shows an exemplary powered device 100 incorporating a second MOV and SIDAC arrangement. For example, the powered device 100 represents an electronic device including a conventional LED driver surge protection clamping circuit solution. As illustrated, the powered device 100 includes a power supply 105, a metal oxide semiconductor FET (MOSFET) 110, resistors 115, 120 leading to a controller 125, and the SIDAC 130 with the suppressor 135 in series. The powered device 100 may be a LED device having an LED load. The load may include a first MOV with a first trigger voltage of when the first MOV becomes used (e.g., to clamp an overvoltage). The suppressor 135 may be a second MOV used via the SIDAC 130 where the suppressor 135 and the SIDAC 130 are arranged in series and may have a lower clamping voltage relative to the first MOV. The SIDAC 130 may be, for example, a diode for alternating current (DIAC) or a self-triggered silicon controller rectifier (SCR) that triggers at a certain voltage level. The MOSFET 110 may represent a downstream conductor that is to remain operational through controlling let through voltages via the suppressor 135 and the SIDAC 130. In a conventional arrangement, the SIDAC 130 and the suppressor 135 may be configured with a combined voltage that determines when this circuit is triggered. This combined voltage is typically set significantly below a breakdown voltage of the MOSFET 110 to ensure that the MOSFET 110 is always protected while considering the tolerances of the suppressor 135, the SIDAC 130, and the guaranteed breakdown voltage limit of the MOSFET 110. The resistors 115, 120 may be standard resistance components placed along a pathway that may sense current. In this instance, the resistors 115, 120 are placed on a pathway from the MOSFET 110 to a positive input of the controller 125 and on a pathway from the MOSFET 110 to a negative input of the controller 125, respectively. The controller 125 may determine when a gate is high or a gate is low corresponding to when the MOSFET 110 is on or off, respectively. The controller 125 may utilize a voltage threshold (e.g., Vgate) to determine the control output.

The conventional arrangement to address let through voltages using the first MOV and the second MOV (e.g., the suppressor 135) with the SIDAC 130 in series encounters drawbacks. This arrangement may be damaged during temporary overvoltages that last more than a typical lightning surge event (e.g., longer than a few milliseconds). This arrangement of overvoltage transient protection also addresses the let through voltages by setting a trigger significantly below the rating of a device that is being protected to allow for tolerances (e.g., the MOSFET 110).

For example, a conventional LED driver may use a boost converter followed by a half bridge inverter. A boost FET may be the first power semiconductor that is impacted by a transient surge. If the FET has a breakdown voltage rating of 600V (e.g., for a LED driver rated for 277Vrms nominal mains voltage), the clamping device (e.g., the SIDAC 130 and the suppressor 135) must be set below this value to protect the FET. Since a simple SIDAC and MOV circuit in series has significant tolerances, typically, these components may be set to trigger at 550V with a 10% tolerance. However, within these limits, there lies a possibility that the clamping device may trigger as low as 500V (e.g., a maximum tolerance in a negative direction). The resulting issue from such limits is that the normal peak voltage of a 277V mains is 392Vpk and 500V is approximately 28% higher than the nominal 277V mains. In poor power quality mains environments, the mains voltages (e.g., power supply 105) may increase by more than 30% temporarily, from a few milliseconds and possibly up to a few seconds. When this scenario occurs, the clamping device triggers. Although the clamping device may handle overvoltages that may go beyond the breakdown voltage of the component being protected, these overvoltages must be transient and not last for a duration beyond a predetermined time duration. When lasting beyond this predetermined time duration, because the suppressor 135 in series must have a low voltage rating to provide the required low let through voltage, the suppressor 135 is overused, may overheat, and become damaged if the overvoltage occurs for more than a few milliseconds or the duration for transients for which this clamping device is configured. There is a near certainty to damage the suppressor 135 when the overvoltage lasts for seconds.

The ensuing problem with this circuit including the clamping device (e.g., the SIDAC 130 and the suppressor 135) is that the protection circuit itself will fail in the above defined circumstances which also result in causing the circuit to fail. With a component along a circuit pathway failing, the circuit may become open and the electronic device may fail (e.g., a fuse opens). Without the protection circuit including the conventional clamping device, the circuit may have withstood voltages up to 600Vpk or higher since the MOSFET 110 may have a breakdown voltage that is configured to handle such an overvoltage (e.g., possibly even 700V depending on the actual breakdown voltage of the MOSFET 110 and not just the rating). Therefore, a circuit without the second stage MOV (e.g., the SIDAC 130 and the suppressor 135) used for protection withstands voltages up to 425Vrms (600Vpk) or even up to 495Vrms (700Vpk) for significantly long periods of time without breakdown. Although the SIDAC 130 and suppressor 135 arrangement in series as a clamping circuit improves the circuits ability to withstand short transients from surges and overvoltages, the ability to withstand temporary overvoltages that may last up to a few seconds becomes much worse and leads to the circuit becoming open and the electronic device failing.

U.S. Pat. No. 6,657,841 B1 relates to a circuit arrangement for overvoltage protection of a power transistor for controlling an inductive load includes a first varistor which bridges-over the supply connections. A second varistor is arranged parallel in relation to the switching path of the power transistor and in series with a switching transistor. The switching transistor can be controlled by a voltage divider which is connected to the supply voltage via a Zener diode.

FR 2 733 648 A1 relates to a circuit that includes zener diode protection circuits (14,18) in series and parallel across the collector of a transistor (T). The load (11) is also connected to the collector, and transistor switching is effected by a circuit across the transistor emitter/base with a thyristor (Th) driven by a varistor. The Thyristor trigger is controlled by the parallel zener diode protection circuit.

CN 205 902 169 relates to a bus type dimming control panel with loads protection, every way transfers light channel unit including adjusting luminance MCU module, adjust luminance power module and protection circuit, the MCU module of adjusting luminance is managed sinusoidal wave phase cut through the drive circuit connection MOS that adjusts luminance, and is continuous through optocoupler isolation module and serial bus, the input and the continuous MOS of the collection pipe control signal of drive circuit that adjusts luminance of protection circuit, the output links to each other to export with the MCU module of adjusting luminance and turn-offs guard signal, two controllability power switch wares of closing are opened including controlling positive and negative half-wave return circuit to the protection circuit.

SUMMARY OF THE INVENTION

The exemplary embodiments are directed to a power control device for overvoltage protection. The power control device comprises a component configured to be powered according to a duty cycle. The power control device comprises a controller configured to determine the duty cycle that places the component on or off. The power control device comprises a comparator configured to determine when the duty cycle is off and an overvoltage is being experienced by the component. When the duty cycle is off and the overvoltage is being experienced by the component, the comparator selects a circuit pathway including a clamping device.

The exemplary embodiments are directed to a method for overvoltage protection. The method comprises determining a duty cycle that places a component to be powered according to the duty cycle on or off. The method comprises determining whether the duty cycle is off and an overvoltage is flowing through the component. When the duty cycle is off and the overvoltage is flowing through the component, the method comprises selecting a circuit pathway including a clamping device.

The exemplary embodiments are directed to a power control device for overvoltage protection. The power control device comprises a metal oxide semiconductor field effect transistor (MOSFET) configured to be powered according to a duty cycle. The power control device comprises a voltage gate configured to control the duty cycle that places the MOSFET on or off. The power control device comprises a comparator configured to determine when the duty cycle is off and an overvoltage is being experienced by the MOSFET. The power control device comprises a metal oxide varistor configured to clamp a current corresponding to the overvoltage. When the duty cycle is off and the overvoltage is being experienced by the MOSFET, the comparator selects a circuit pathway including the MOV.

DETAILED DESCRIPTION

Figure 1:
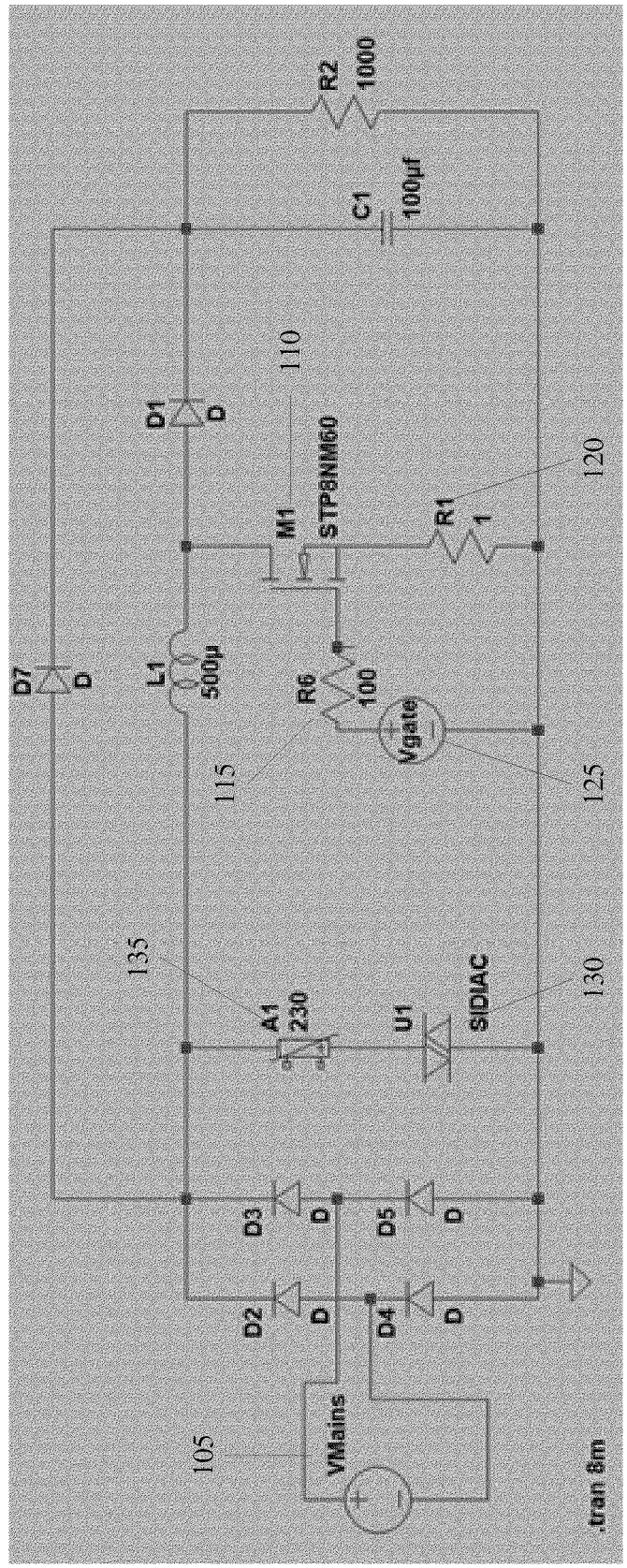
FIG. 1 shows an exemplary powered device.

The exemplary embodiments may be further understood with reference to the following description and the related appended drawings, wherein like elements are provided with the same reference numerals. The exemplary embodiments are related to a device, a system, and a method for protecting an electronic device or a component of the electronic device from an overvoltage when a voltage avalanches. The exemplary embodiments provide a power control mechanism that dynamically selects the manner to handle an overvoltage based on the type of overvoltage that is being experienced. In selecting the manner, the power control mechanism determines a pathway to use for the overvoltage based on a reference threshold defined by a breakdown voltage of the component of the electronic device to be protected. As will be described in detail below, the power control mechanism according to the exemplary embodiments is configured to handle transient overvoltages having a voltage greater than a breakdown voltage of the component by relying on a clamping device as well as longer overvoltages having a voltage lower than the breakdown voltage by relying on the component itself.

The exemplary embodiments are described with regard to particular circuitry components that are interconnected within the power control mechanism of the electronic device. The exemplary embodiments are also described with regard to these particular circuitry components being arranged in a specific configuration. However, the types of circuitry components and the specific arrangement are only for illustrative purposes. Different types of circuitry components and different arrangements may also be used within the scope of the exemplary embodiments to achieve a substantially similar protection to overvoltages. In a first example, the load of the electronic device is described as a diode such as a light emitting diode (LED). However, the load may include any sub-component that draws power to activate the sub-component or stops drawing power to deactivate the sub-component. In a second example, the electronic device is described as having a first and a second suppressor where the suppressor is a metal oxide varistor (MOV). However, the first MOV may be absent in the exemplary embodiments. The suppressors may also be any type of component configured to suppress an overvoltage. In a third example, the component to be protected in the electronic device is a semiconductor such as a metal oxide semiconductor field effect transistor (MOSFET). However, any component may be selected to be protected using the power control mechanism according to the exemplary embodiments. In a fourth example, the component may be controlled by a voltage gate. However, other control components may be used such as an integrated circuit.

The exemplary embodiments are further described with regard to certain values of the component to be protected. For example, the values may be threshold voltages for various parameters or ratings (e.g., clamping voltage, breakdown voltage, peak voltage, etc.). However, these exemplary values pertain to the type of component and also to a specific form of the type of component. Thus, any values used to describe the power control mechanism according to the exemplary embodiments is only for illustrative purposes and other values corresponding to other forms and/or types of components may be used within the scope of the exemplary embodiments.

The exemplary embodiments provide a power control mechanism incorporated in a powered electronic device that provides protection for transient overvoltages while also providing further protection for longer overvoltages without causing components of the power control mechanism to fail. The transient overvoltages may be greater than a breakdown voltage of a component to be protected while the longer overvoltages may be less than the breakdown voltage. In handling both transient overvoltages and longer overvoltages, the power control mechanism dynamically selects a circuit pathway that corresponds to the type of overvoltage being experienced. To dynamically select the circuit pathway, the power control mechanism has an arrangement where a suppressor is arranged in series with a triggered device (e.g., a silicon controlled rectifier (SCR)) which is triggered by an avalanching of the component being protected (e.g., a MOSFET).

Figure 2:
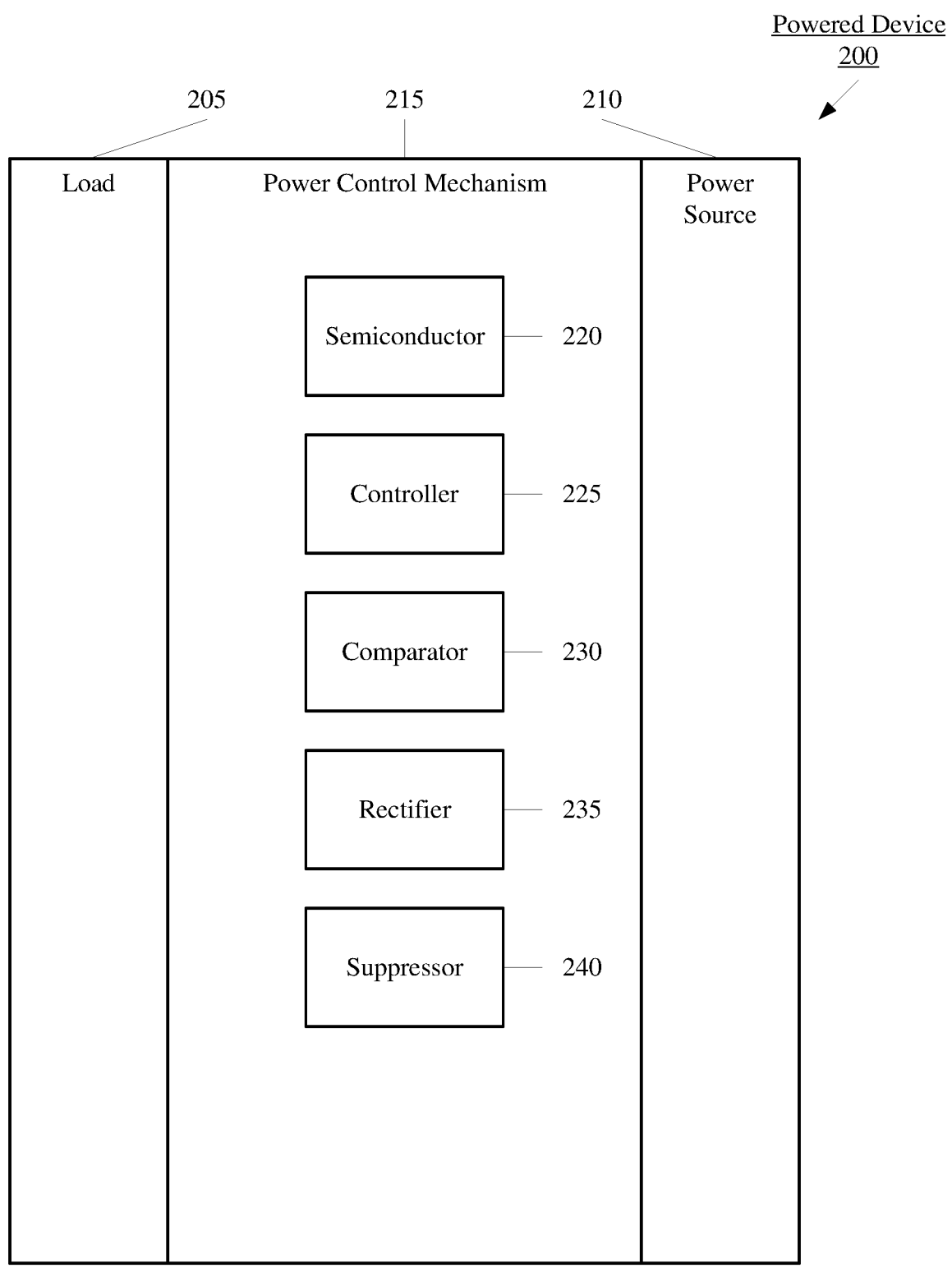
FIG. 2 shows an exemplary powered device according to the exemplary embodiments.

FIG. 2 shows an exemplary powered device 200 according to the exemplary embodiments. The powered device 200 includes a load 205 that consumes power provided by a power source 210. The load 205 may be any type of component that draws power (e.g., a LED, a light bulb, an audio output component, etc.). The powered device 200 may include a power control mechanism 215 through which power flows from the power source 210 to the load 205.

The power control mechanism 215 may include a semiconductor 220, a controller 225, a comparator 230, a rectifier 235, and a suppressor 240. The controller 225 may control whether the semiconductor 220 is high or low (e.g., on or off). Power may flow through the power control mechanism 215 through the comparator 230 such that the power is directed to an intended pathway when an overvoltage is detected. In one pathway, the overvoltage may flow through the rectifier 235 and the suppressor 240. The components of the power control mechanism 215 may be arranged with corresponding pathways such that the above operations are properly performed.

The powered device 200 is illustrated where the components are incorporated into one overall electronic device. However, in another implementation, the components of the powered device 200 may be at least partially separated from one another while having a communication functionality, may be modular components (e.g., separate components connected to one another), may be incorporated into one or more devices, or a combination thereof. For example, the powered device 200 may include voltage or current sensors that provide data to a modular determination component that sends a signal to the comparator 230. The powered device 200 may also utilize a wired connection between the components. However, those skilled in the art will understand that any manner of communication of signals, power, or other indications/commands may be used between the components of the powered device 200. For example, a wired connection, a wireless connection, a network connection, or a combination thereof may be used.

According to the exemplary embodiments, the power control mechanism 215 may protect the semiconductor 220 from overvoltages that cause the semiconductor 220 to fail. Based on the specifications and manufacturing, the semiconductor 220 may have a breakdown voltage including a maximum voltage that the semiconductor 220 may withstand before the semiconductor 220 fails. The breakdown voltage of the semiconductor 220 may allow for overvoltages corresponding to this breakdown voltage or lower to be handled by the semiconductor 220. Overvoltages that flow through the semiconductor 220 within the allowed limits based on the breakdown voltage may continue without causing the semiconductor 220 to fail. Thus, when such an overvoltage is experienced, the power control mechanism 215 may select a first pathway that enables the semiconductor 220 to handle the overvoltage.

The semiconductor 220 may also be protected from transient overvoltages that may have a voltage greater than a breakdown voltage of the semiconductor 220 using the suppressor 240. The suppressor 240 may be positioned along a second pathway such that the transient overvoltage is directed to the suppressor 240. In this manner, the semiconductor 220 may be protected from the overvoltage and the suppressor 240 may be used in an intended manner that maintains its integrity without failing and causing the circuit to open (e.g., does not overheat from prolonged usage). As will be described in an exemplary implementation, the power control mechanism 215 may determine when the transient overvoltage is being experienced and when the second pathway toward the suppressor 240 is to be selected. For example, the comparator 230 may determine when the semiconductor 220 is off and an avalanche current resulting in a corresponding overvoltage that is greater than a threshold voltage set to protect the semiconductor 220 is being experienced. Thus, the power control mechanism 215 may not activate use of the suppressor 240 for any temporary mains voltage fluctuations that are below the breakdown voltage of the semiconductor 220. For example, a typical 600V FET with an actual breakdown voltage of 660Vpk is capable of indefinitely sustaining a mains voltage of 467Vrms (e.g., 660Vpk/√2) or 68% above the 277V nominal mains voltage. By sensing for the avalanche current only during a time that the MOSFET is off (e.g., to blank out any normal MOSFET current during operation), the power control mechanism 215 may be allowed to set a substantially low avalanche trip current to use the suppressor 240 (e.g. setting the avalanche current according to the avalanche rating of the semiconductor 220).

Figure 3:
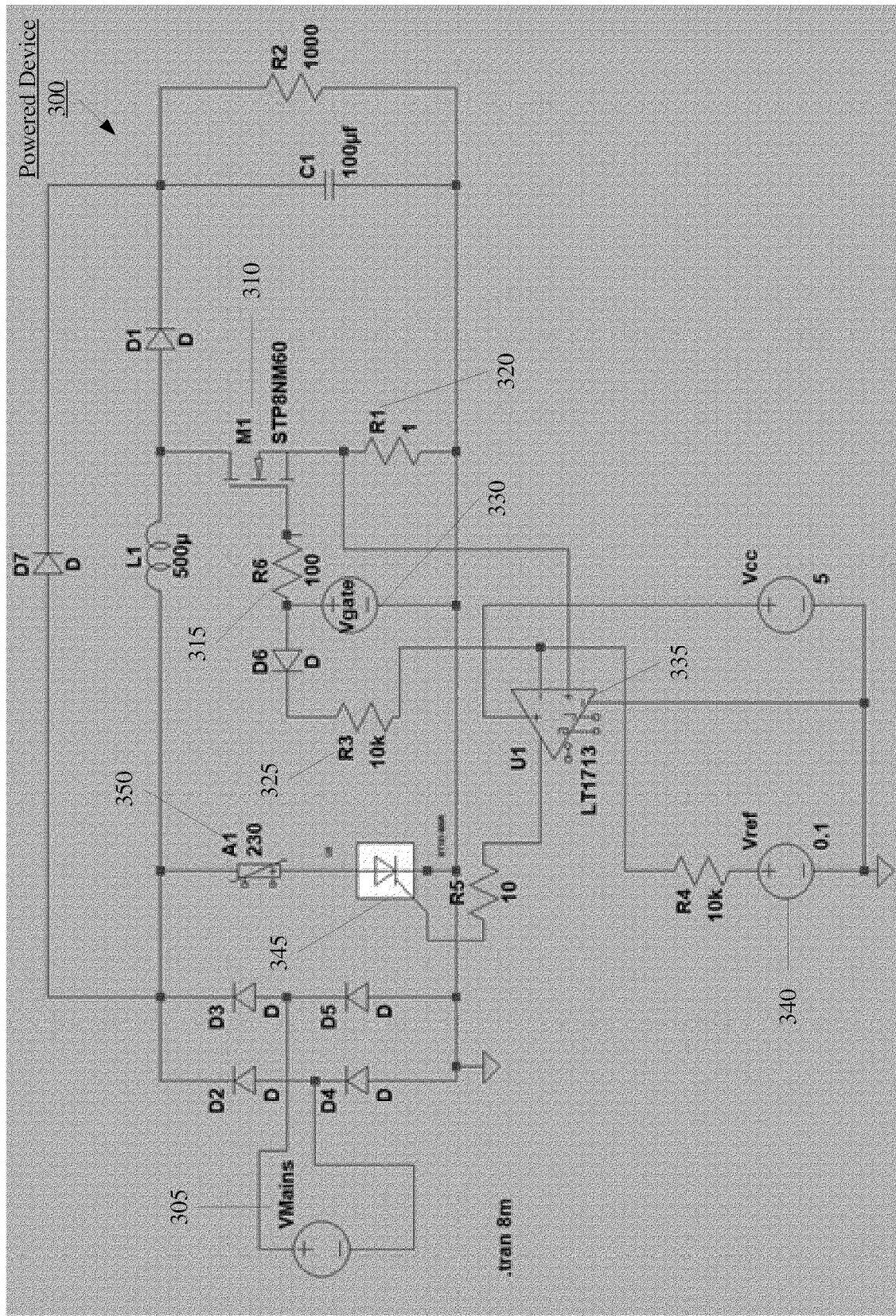
FIG. 3 shows an exemplary implementation of a powered device according to the exemplary embodiments.

FIG. 3 shows an exemplary implementation of a powered device 300 of FIG. 2 according to the exemplary embodiments. The powered device 300 may be a particular arrangement of the powered device 200 of FIG. 2 according to the exemplary embodiments. The implementation of the powered device 300 illustrated in FIG. 3 relates to the power control mechanism 215 being arranged in a manner so that a first pathway may be selected when an overvoltage greater than a breakdown voltage of the semiconductor 220 is determined and a second pathway may be selected that relies on the semiconductor 220 to handle any overvoltage lower than the breakdown voltage. The powered device 300 may include a power supply 305, a semiconductor 310, resistors 315, 320, 325, a controller 330, a comparator 335, a threshold gate 340, a rectifier 345, and a suppressor 350. The powered device 300 is also shown with further components including, for example, a plurality of diodes (e.g., a diode D7 serving as a bypass diode), an inductor (e.g., L1), and a diode (e.g., D1) associated with the semiconductor 310 to form a normal boost converter circuit, a capacitor (e.g., C1) serving conventional power supply operations, etc. These further components may substantially correspond to components used in conventional powered devices for purposes understood by those skilled in the art.

The implementation of the powered device 300 in FIG. 3 may be any circuitry implementation in which the components are interconnected with one another for signals to be exchanged and power to be supplied along various circuit pathways. These components may be included on one or more integrated circuits, on one or more printed circuit boards, or implemented individually as needed. The exemplary implementation of the powered device 300 described herein relates to the powered device 300 being a set of circuitry components. However, the powered device 300 may also be implemented in a variety of other ways. For example, the powered device 300 may include more complex components, particularly if dynamic settings (e.g., greater than two settings) are to be used.

In this example, the powered device 300 may be a lighting device having, for example, a LED load. As illustrated, in the implementation of FIG. 3, the component to be protected by the power control mechanism 215 may be the semiconductor 310 shown as a MOSFET. The resistors 315, 320, 325 may be placed along pathways to sense current. The controller 330 may determine when a gate is high or low corresponding to when the MOSFET 310 is on or off, respectively. The controller 330 may utilize a voltage threshold (e.g., Vgate) to determine the control output. The controller 330 is shown as a gate signal generator that goes high or low based on a duty cycle. However, the use of a gate is only illustrative and may instead be a normal boost converter control integrated circuit. The comparator 335 may determine when the gate is off to determine whether an overvoltage warrants use of the suppressor 350 based on a threshold set by the threshold gate 340. The threshold gate 340 may set a threshold to indicate when the semiconductor 310 or the suppressor 350 is to handle the overvoltage. When the overvoltage is within the threshold of the threshold gate 340, the comparator 335 selects a first pathway such that the circuit excludes the suppressor 350. When the overvoltage is greater than the threshold of the threshold gate 340, the comparator 335 selects a second pathway such that the circuit includes the suppressor 350. The rectifier 345 may enable a flow in a single direction. The rectifier 345 is shown as a SCR. The suppressor 350 is shown as a MOV (e.g., a second MOV to a first MOV included in the load).

According to the exemplary embodiments, the flow through the circuitry in the powered device 300 includes passing a protection circuit including an SCR (e.g., the rectifier 345) in series with a low voltage MOV (e.g., the suppressor 350) to protect the boost FET (e.g., the semiconductor 310). Within the circuit pathways, current sensing resistors in series are used to detect avalanche current in the semiconductor 310 during the time the gate signal is low or when the semiconductor 310 is off (e.g., the controller 330 sets a low gate). In this way, the level of a trip current avalanching may be set independent of the normal semiconductor 310 current during operation (e.g., while the gate voltage is high). A comparator 335 may be used to blank the avalanche current sensing circuit during the gate high signal.

The suppressor 350 may be a MOV with a low voltage rating that ensures that the let through voltage is below a breakdown voltage rating of the semiconductor 310 (e.g., 600V rating). Again, the breakdown voltage rating may not correspond to an actual breakdown voltage that causes the semiconductor 310 to fail. While the gate voltage of the semiconductor 310 is high, the negative input of the comparator 335 is pulled high (e.g., to 12V) making sure that the output of the comparator 335 is zero independent of the current through the semiconductor 310 and the voltage sensed on the resistor 320.

While the gate voltage of the semiconductor 310 is low, the negative input of the comparator 335 is set equal to a reference voltage or threshold as defined by the threshold gate 340. The reference voltage or threshold of the threshold gate 340 may be set to any value. For example, the threshold may be a tolerance value that the semiconductor 31 is to handle for overvoltages beyond the actual breakdown voltage of the semiconductor 310. In the implementation of the powered device 300 illustrated in FIG. 3, the threshold may be set to 0.1V. Thus, when the voltage (e.g., as measured at resistor 320) is at least 0.1V, the threshold is met. Again, the use of any value including the threshold being 0.1V is only exemplary. The threshold may be selected to allow for a greater tolerance to be handled by the semiconductor 310 or for a stricter tolerance when the semiconductor 310 is not afforded any tolerance. For example, the threshold may be set higher than 0.1V if the semiconductor 310 is to handle a greater load. In another example, the threshold may be set to any positive value such that the semiconductor 310 is provided a higher standard of protection. Based on the threshold, any voltage on the resistor 320 (e.g., from current flowing through the semiconductor 310 when the semiconductor is supposed to be off) greater than the threshold pulls the comparator 335 output to high. This results in the pathway to the rectifier 345 to be open and become triggered, leading to the suppressor 350. According to the implementation with the threshold set to 0.1V, the avalanche current through the semiconductor 310 that triggers the rectifier 345 and the suppressor 350 is set at 100 mA. This value may be set arbitrarily based on the desired trip level using a different threshold or different resistor 320.

Figure 4:
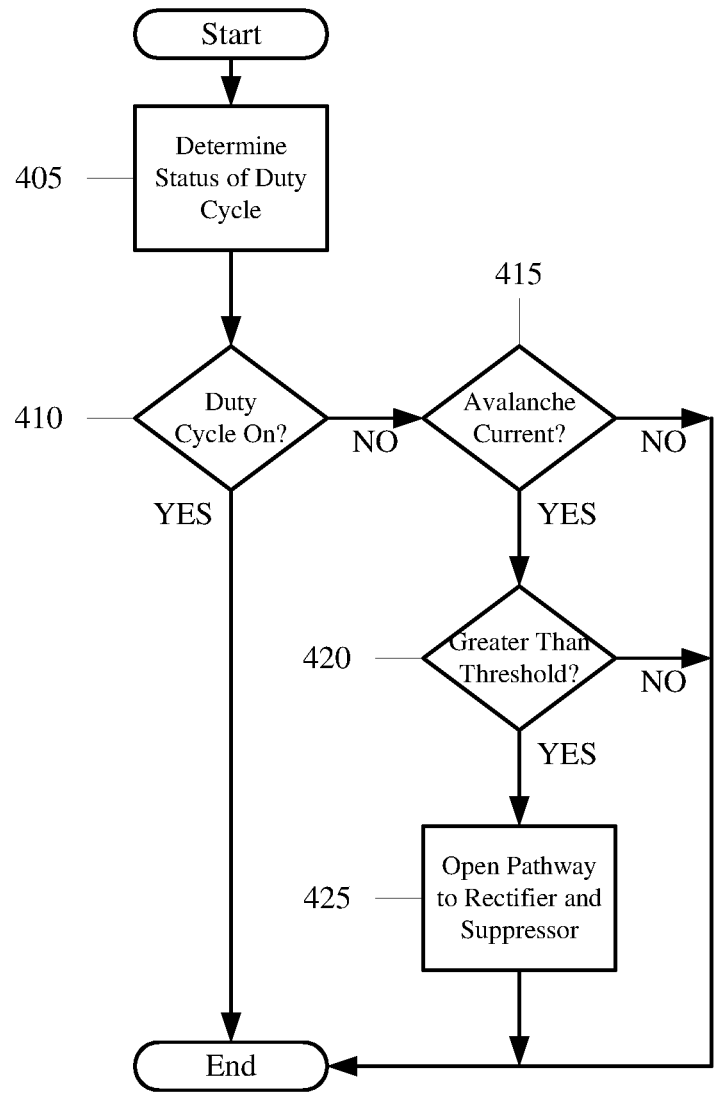
FIG. 4 shows a method for protecting a powered device from an avalanche current according to the exemplary embodiments.

FIG. 4 shows an exemplary method 400 for protecting the semiconductor 310 of the powered device 300 from an avalanche current according to the exemplary embodiments. The method 400 may relate to the mechanism of the exemplary embodiments in which the semiconductor 310 being off with the overvoltage being greater than a threshold utilizes a first circuit pathway including the suppressor 350 while the semiconductor 310 being on or the semiconductor 310 being off with the overvoltage being lower than the threshold utilizes a second circuit pathway excluding the suppressor 350. The method 400 will be described from the perspective of the power control mechanism 215 of the powered device 200 as well as the implementation of the powered device 300 as circuitry units as illustrated in FIG. 3. Substantially similar components of the powered device 200 and exemplary implementation of the powered device 300 will be used interchangeably.

In 405, the power control mechanism 215 determines a status of a duty cycle. For example, the comparator 335 may determine whether the controller 330 has turned the semiconductor 310 on or off (e.g., the controller 330 being a control signal gate that places the gate high or low). As described above, the power control mechanism 215 may be used when the duty cycle of the semiconductor 310 is off. Thus, in 410, the power control mechanism 215 determines whether to set a circuit pathway that excludes the clamping device including the rectifier 345 and the suppressor 350. For example, during times of the duty cycle that the semiconductor 310 is on, an output of the comparator 335 may be zero independent of a current through the semiconductor 310 and voltages sensed at resistor 320. In this manner, the semiconductor 310 may proceed with normal operation.

Returning to 410, when the duty cycle is off, the power control mechanism 215 proceeds to 415 where the power control mechanism determines whether an overvoltage is being experienced. For example, with the semiconductor 310 being off, there should not be any current flowing through the resistor 320 under normal conditions. Thus, with no overvoltage, the comparator 335 may output a zero and set the circuit pathway that excludes the clamping device.

When an overvoltage is being experienced, a voltage may be sensed at the resistor 320. In 420, the power control mechanism 215 determines whether the overvoltage has a magnitude that is greater than a threshold. The threshold may be set by a threshold gate 340 along a circuit pathway associated with the comparator 335. The threshold may be selected based on a tolerance that the semiconductor 310 is expected to tolerate without failing. Thus, the threshold may be generous when the semiconductor 310 is expected to tolerate a greater amount of an overvoltage or strict when the semiconductor 310 is expected to tolerate a lesser amount of an overvoltage. For example, the threshold may be set to 0.1V. When the overvoltage is less than the threshold, the comparator 335 may output a zero and set the circuit pathway that excludes the clamping device.

When the overvoltage is greater than the threshold while the semiconductor 310 is off, the power control mechanism 215 may rely on the clamping device including the rectifier 345 and the suppressor 350. In 425, the power control mechanism 215 opens a circuit pathway that includes the clamping device. As described above, the clamping device may be set with a substantially low trigger voltage. For example, any voltage that is sensed at the rectifier 345 may trigger the rectifier to allow the voltage to flow to the suppressor 350. In this manner, a transient overvoltage (especially one that is greater than an actual breakdown voltage of the semiconductor 310) may be handled by the clamping device without leading to damage to the clamping device from overuse.

The method 400 may be used continuously while the powered device 200 continues to be used. That is, the selection of the circuit pathway may be performed at any time. Thus, at a first instance, the comparator 335 may have selected a circuit pathway that excludes the clamping device. However, at a second instance, there may have been a change to the conditions of the powered device 200 that leads the comparator 335 to have selected a circuit pathway that includes the clamping device. At a third instance, there may have been a further change to the conditions of the powered device 200 that leads the comparator 335 to return to the circuit pathway that excludes the clamping device. In this manner, the power control mechanism 215 may dynamically protect the semiconductor 310 while maintaining a closed circuit for the powered device 200 to remain operational.

The exemplary embodiments provide a device, system, and method of protecting a component of a powered device from an overvoltage by selectively utilizing a clamping device. A power control mechanism may determine when the clamping device is to be used under conditions that the clamping device is not damaged from overuse due to the clamping device having a substantially low trigger voltage. The conditions that the clamping device is used may be when the component is off and an overvoltage that is sensed is greater than a tolerance threshold set for the component.

Those skilled in the art will understand that the above-described exemplary embodiments may be implemented in any suitable software or hardware configuration or combination thereof. In a further example, the exemplary embodiments of the above described method may be embodied as a computer program product containing lines of code stored on a computer readable storage medium that may be executed on a processor or microprocessor. The storage medium may be, for example, a local or remote data repository compatible or formatted for use with the above noted operating systems using any storage operation.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

The invention claimed is:

1. A power control device, comprising:
a metal oxide semiconductor field effect transistor (MOSFET) configured to be controlled according to a duty cycle;
a controller configured to determine the duty cycle that places the MOSFET in a high/on or low/off state;
a comparator configured to determine when the duty cycle is low/off and an overvoltage is being experienced by the MOSFET,
wherein, when the duty cycle is low/off and the overvoltage is being experienced by the MOSFET, the comparator engages a clamping device connected to the MOSFET, wherein the clamping device includes a rectifier in series with a suppressor, wherein the rectifier is a silicon controlled rectifier (SCR) and the suppressor is a metal oxide varistor (MOV); and
wherein, when the duty cycle is off and the overvoltage is being experienced by the MOSFET, the comparator engages the MOV of the clamping device.

2. The power control device of claim 1, wherein, when one of (a) the duty cycle is on or (b) the duty cycle is off with no overvoltage being experienced by the MOSFET, the comparator selects a further circuit pathway excluding the clamping device.

3. The power control device of claim 1, wherein the comparator determines whether the overvoltage is greater than a threshold.

4. The power control device of claim 3, wherein the comparator selects the circuit pathway including the clamping device when the duty cycle is off, the overvoltage is falling over the MOSFET, and the overvoltage is greater than the threshold.

5. The power control device of claim 1, wherein the controller is a voltage gate configured to control the duty cycle that places the MOSFET in the high/on or low/off state.

6. The power control device of claim 1, wherein the clamping device has a trigger voltage that is lower than a breakdown voltage rating of the MOSFET.

7. The power control device of claim 1, wherein, when the duty cycle is off and no overvoltage is being experienced by the MOSFET, the comparator disengages the MOV of the clamping device.

8. A method, comprising:
   determining a duty cycle that places a metal oxide semiconductor field effect transistor (MOSFET) to be powered according to the duty cycle on or off;
   determining whether the duty cycle is off and an overvoltage is flowing through the MOSFET; and
   when the duty cycle is off and the overvoltage is flowing through the MOSFET, engaging a clamping device connected to the MOSFET, wherein the clamping device includes a rectifier in series with a suppressor, wherein the rectifier is a silicon controlled rectifier (SCR) and the suppressor is a metal oxide varistor (MOV);
   wherein, when the duty cycle is off and the overvoltage is being experienced by the MOSFET, the comparator engages the MOV of the clamping device.

9. The method of claim 8, further comprising:
   determining whether the overvoltage is greater than a threshold,
   engaging the clamping device when the duty cycle is off, the overvoltage is flowing through the MOSFET, and the overvoltage is greater than the threshold.

10. The method of claim 8, further comprising:
    when one of (a) the duty cycle is on or (b) the duty cycle is off with no overvoltage being experienced by the MOSFET, disengaging the clamping device.

\* \* \* \* \*